United States Patent [19]
Johänntgen et al.

[11] Patent Number: 5,687,674
[45] Date of Patent: Nov. 18, 1997

[54] STEAM POWER PLANT FOR GENERATING ELECTRIC POWER

[75] Inventors: Uwe Johänntgen, Wadgassen; Franz Josef Marx, St. Wendel, both of Germany

[73] Assignee: Saarbergwerke Aktiengesellschaft, Saarbrücken, Germany

[21] Appl. No.: 367,163

[22] PCT Filed: May 9, 1994

[86] PCT No.: PCT/DE94/00530

§ 371 Date: Feb. 3, 1995

§ 102(e) Date: Feb. 3, 1995

[87] PCT Pub. No.: WO94/27089

PCT Pub. Date: Nov. 24, 1994

[30] Foreign Application Priority Data

May 10, 1993 [DE] Germany .............. 43 15 482.4
Oct. 15, 1993 [DE] Germany .............. 43 35 216.2

[51] Int. Cl.⁶ .................................................. E22B 33/00
[52] U.S. Cl. .............. 122/1 A; 122/1 C; 122/420; 122/421; 122/DIG. 7; 110/234
[58] Field of Search ................. 110/302, 234, 110/348; 122/1 C, 1 A, 406.5, DIG. 7, 420, 421

[56] References Cited

U.S. PATENT DOCUMENTS

| | | |
|---|---|---|
| 4,319,458 | 3/1982 | Berkley ................... 60/693 |
| 5,293,841 | 3/1994 | Suhr et al. ............... 122/1 A |

*Primary Examiner*—John M. Sollecito
*Assistant Examiner*—Steve Gravini
*Attorney, Agent, or Firm*—James Creighton Wray

[57] ABSTRACT

A steam power plant for generating electric power has a fossil-fuelled boiler, a water-steam cycle for generating high-tension, superheated steam for a steam turbine, an economizer to transmit heat from flue gas to the feed-water, an air preheater to transmit flue gas heat to fresh air and devices for removing dust, sulphur and possibly nitrogen from the flue gases. In order to optimize heat exchange in the air preheater during operation and reduce the heat loses during start-up of the steam power plant, a heat exchanger system is provided with sections through which recirculated air and a heat vehicle medium flow, in which the section carrying the air is connected on the intake side to the fresh-air outlet of the air preheater and on the outlet side to the fresh-air intake of the air preheater.

13 Claims, 2 Drawing Sheets

STEAM POWER PLANT FOR GENERATING ELECTRIC POWER

BACKGROUND OF THE INVENTION

The invention describes a steam power plant for generating electric power which has a fossil-fuelled boiler, a water-steam cycle for generating high-tension, superheated steam for a steam turbine, an economizer to transmit flue gas heat to the feed-water, an air preheater to transmit flue gas heat to fresh air and devices for removing dust, sulphur and possibly nitrogen from the flue gases.

In steam power plants which are operated with fossil fuels, i.e. gaseous, fluid or solid fuels, the heat flux capacities (mass flow rate x specific heat capacity) of the flue gas which is to be cooled and the fresh air which is to be heated (combustion air) are different so that there is a temperature difference of up to 90° C. at the cold end of the heat exchanger with a customary temperature difference between flue gas and fresh air of approximately 30° C. at the warm end of the air preheater. These high differences in temperature result in corresponding energy losses and have a corresponding negative effect on the overall efficiency of the power plant.

Another disadvantage is that in power plants which are not equipped to further use the residual heat which is still at a relatively high temperature level in the flue gas which leaves the air preheater, be it through reheating the cleaned flue gas before it enters the chimney or be it through decoupling the heat for long-distance energy use, the residual heat is destroyed in the flue gas desulphurizing plant. The result is another decrease in the power plant's overall efficiency.

Another factor is that the start-up process in the known steam power plants described in the introduction is not advantageous. For example, before coal can be burnt in a coal-fuelled plant, considerable amounts of expensive auxiliary combustibles such as oil or gas must be burned in the boiler before the coal can be burnt until the parts of the plant—for example the mills for the lignite pulverizer dryer of the coal, the catalytic nitrogen removal reactor and the air preheater with its large regenerative heat accumulator masses, which must be heated with the help of the flue gas heat—reach their required minimum operating temperatures. Furthermore, the steam which is produced during the start-up but also during the shut down phase generally is precipitated in the capacitor of the steam power plant without utilizing the heat.

The invention was charged with reducing the loss of energy in a power plant as described in the introduction, to better utilize the heat of the flue gas and to make the start-up process more economical overall by using less oil or gas and by better utilizing the steam which is generated during the start-up phase.

SUMMARY OF THE INVENTION

This task is solved in accordance with the invention through a steam power plant which is characterized in that it has a first heat exchanger system with sections through which recirculated air and a heat vehicle medium flow and in which the section carrying the air is connected on the intake side to the fresh-air outlet of the air preheater and on the outlet side to the fresh-air intake of the air preheater.

Compared to the state of the art, the measures proposed in accordance with the invention result in a clear reduction of energy losses in the air preheater, in a considerably improved utilization of the heat which is contained in the flue gas, and therefore in a marked increase of the overall efficiency of such a steam power plant.

The recirculation air stream of the first heat exchanger system which is superimposed to the fresh air in the area of the air preheater makes it possible to almost completely align the heat flux capacities in the two heat exchanger sections of the air preheater. The result is that there are low temperature differences at the warm, as well as at the cold end, and correspondingly reduced energy losses. Some of the flue gas heat which is released in the air preheater which was transmitted to relatively cold fresh air in the customary design is now directly coupled into the water-steam cycle of the power plant at a higher temperature level via the recirculation air stream and the first heat exchanger system.

Since the recirculation air stream in accordance with the invention makes it possible to regulate the equilibrium of the heat flux capacities between the two sections in the air preheater, the fresh air can be preheated before it is introduced into the air preheater, i.e. the residue heat which is contained in the flue gas before it is desulphurized can be used in the entire process due to the transmission of the fresh air into the second heater exchange system in accordance with the invention. The result therefore is a further improvement of the overall efficiency of the power plant.

The invention is especially advantageous for power plants in which the desulphurized cold flue gases are introduced directly into the cooling tower of the power plant and are released into the atmosphere together with the cooling air and in which it is possible to decouple the residue heat of the flue gas for long-distance energy uses or other uses. In these cases the design in accordance with the invention makes it possible to reintroduce the entire residual heat which is still contained in the flue gas into the power plant cycle under thermodynamically favorable conditions.

In power plants which use the residual flue gas heat either for long-distance energy purposes or for heating the desulphurized flue gases which are to be released into the atmosphere via a chimney, the overall efficiency can be improved with the help of another characteristic of the invention by preheating the fresh air before it enters the air preheater, in a steam-air-preheater by transmitting the low temperature heat from the water-steam cycle.

The design in accordance with the invention generally makes it possible to bring the low temperature heat, which is produced in the power plant, to a higher temperature level by transmitting it to the fresh air, by coupling it into the air preheater and by reintroducing it into the water-steam cycle.

Important advantages with regard to the start-up phase of a steam power plant can be achieved if—as intended by the invention—the first heat exchanger system is used as a start-up heat exchanger. This makes it possible to preheat the regenerative heat accumulations of the air preheater already before the start-up phase of the steam power plant begins, i.e. already before the burners in the boilers are ignited.

For this purpose heat is transmitted to the recirculation air which is in the cycle between the still cold air preheater and the start-up heat exchanger via any heat vehicle in the start-up heat exchanger, and the regenerative heat accumulations of the air preheater are heated in the process.

Due to the preheating of the fact that the air preheater is preheated, the fresh combustion air, which is introduced into the boiler via the air preheater during the consequent start-up of the steam power plant, is heated correspondingly. The results are advantageous effects during cold-start with boiler surfaces that are already cold, as well as during hot start with boiler surfaces that are still hot. The plant heats up faster during a cold start, i.e. less oil or gas is needed in the boiler while there is a minimal super-cooling due to inflowing cold combustion air during a hot start.

The advantage with coal-fuelled steam power plants—and this constitutes the most important application of the invention—is that by preheating the air preheater, the minimum temperatures following the air preheater, which are required for the start-up of the coal heat lignite pulverizer dryer, can be reached quicker. The result is that it is possible to switch faster from the oil or gas fuelling, which is customary during the start-up, to the normal coal fuelling. Another advantage is that the operating temperatures needed for the nitrogen removal reactor can be reached faster while the efficiency of the nitrogen removal, and therefore the effects on the environment, are influenced accordingly.

Another advantage which results from preheating the air preheater is that when flue gas which is not yet desulphurized is first introduced into the air preheater, a strong cooling with a corresponding dew point is avoided which results in a correspondingly reduced corrosion inside the air preheater, as well as in any subsequent parts of the facility, e.g. the electrostatic filter.

As already stated, the start-up heat, which is coupled into the air preheater via the start-up heat exchanger, can be from any source. It can be, for example, the heat from another steam power plant which is located at the same site, or it can be the waste heat of any other industrial plant.

For reasons of practicality, another characteristic of the invention is that the heat vehicle is feed-water from a feed-water container of the water-steam cycle, which is already heated to temperature by the start-up steam from the steam power plant, from neighboring plants or from separate boilers.

If necessary, the temperature of the used feed-water can be further increased in another heat exchanger through heat exchange with the condensed start-up steam before it is cooled in the start-up heat exchanger.

Further explanations concerning the invention can be taken from the examples which are shown schematically in the figures.

DETAILED DESCRIPTION OF THE PREFERRED EMBODIMENTS

Figure 1:
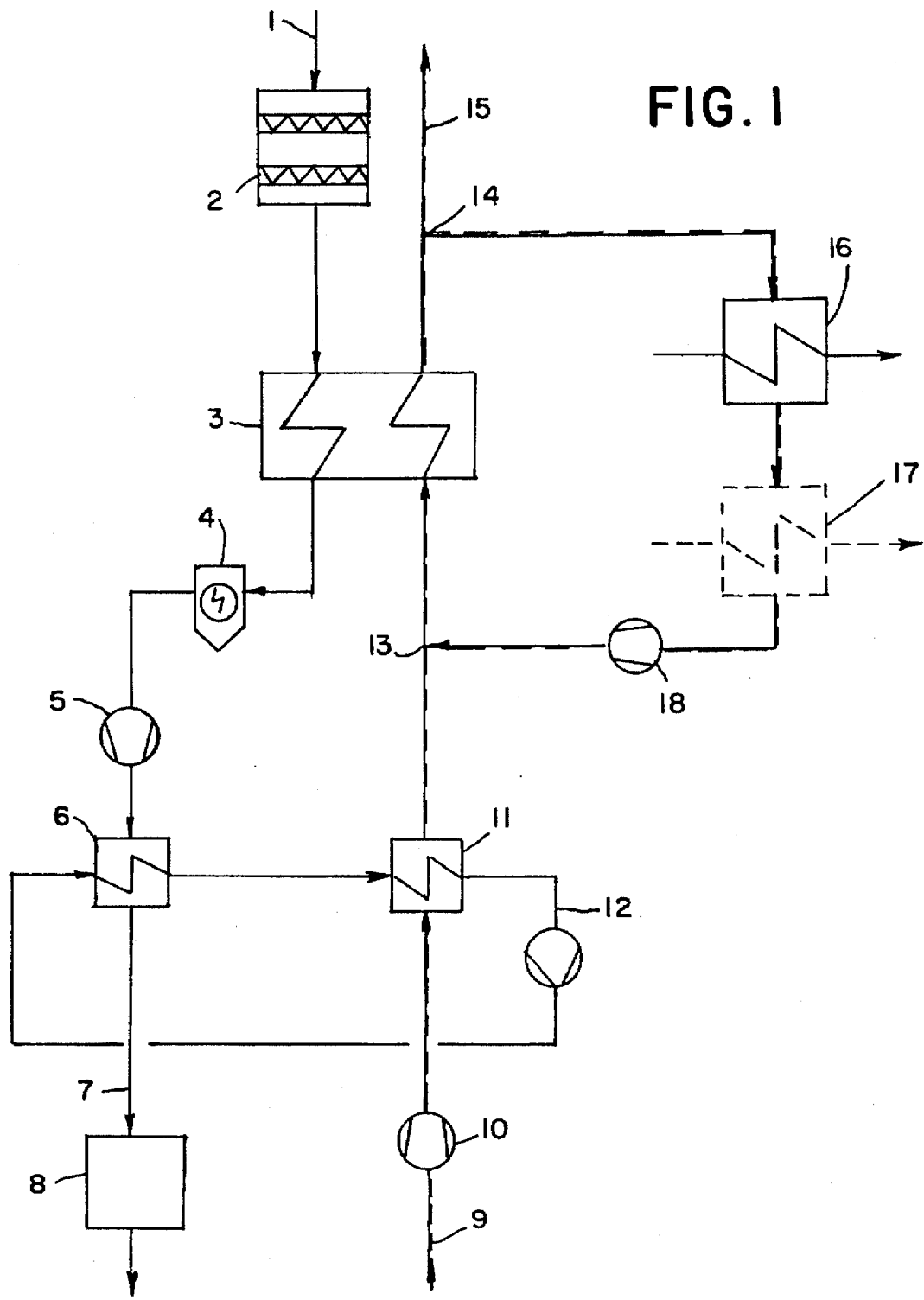
FIG. 1 shows an example of a circuit lay-out for decreasing heat losses during the operation of a steam power plant.

In accordance with FIG. 1, hot flue gas from a steam generator of a coal-fuelled power plant is transmitted to a nitrogen removal plant 2 and then to an air preheater 3 with a temperature of approximately 380° C. via a line 1. Inside the air preheater 3 the flue gas is cooled to 130° C. due to the heat exchange with air. After it has passed through an electrostatic filter 4 and an induced draught ventilator 5, the flue gas is further cooled from approximately 130° C. to approximately 80°–90° C. in a heat exchanger 6 of a second heat exchanger system which consists of heat exchangers 6 and 11 as well as a cycle water system 12. Then the cooled flue gas is fed into a flue gas desulphurization plant 8 via a line 7 and then is released into the atmosphere together with the cooling air via the cooling tower of the power plant which is not shown.

The combustion air which is needed inside the steam generator is supplied to the power plant via a line 9 and a ventilator 10 and at first is preheated to a temperature of approximately 70–°80° C. in a heat exchanger 11. The heat needed for the preheating process is transmitted via a closed cycle water system 12 by the heat exchanger 6 into the heat exchanger 11.

At a mixing point recirculating air—whose temperature and mass flux is such that there is an approximate heat flux equilibrium inside the air preheater 3, i.e. the desired small temperature differences between the flue gas and the air are now present at the cold as well as the warm end of the air preheater—is added to the fresh air which is preheated in the heat exchanger 11.

After the recirculation air stream has passed the air preheater, it is again separated from the fresh air stream at a separation point 14. While the fresh air is supplied to the fuelling of the steam generator via a line 15 and at a temperature of 350° C., the recirculation air is cooled again in a first heat exchanger system in a heat exchanger 16 by exchanging heat with high pressure feed-water and, if necessary, in a second heat exchanger 17 by exchanging heat with low-pressure feed-water and then is transported back to the mixing point via an adjustable ventilator 18.

Figure 2:
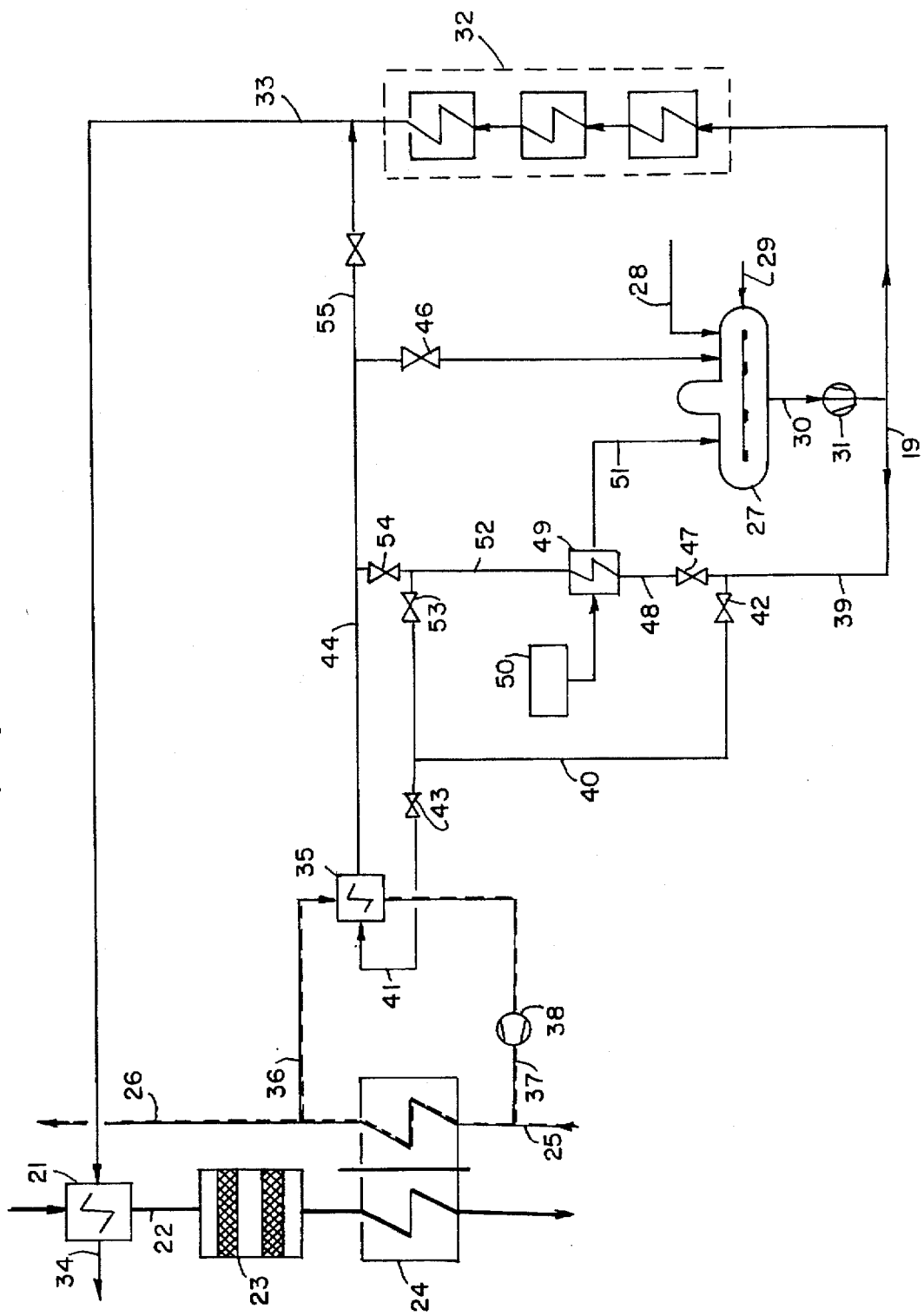
FIG. 2 shows an example of a circuit lay-out for decreasing heat losses during the start-up phase of a steam power plant.

FIG. 2 shows schematic sections of a circuit of a coal-fuelled steam power plant. The hot flue gas is supplied from an economizer 21 of the steam generator power plant via a line 22 to a catalytic nitrogen removal reactor 23 and finally to an air preheater 24. Inside the economizer 21 the flue gas is cooled to the optimal operating temperature of the nitrogen removal reactor 23 of approximately 350°–380° C. through heat exchange with feed-water. It is cooled to approximately 130° C. through heat exchange with fresh combustion air in the subsequent air preheater 24. After it is cooled down, dust or sulphur are removed from the flue gas in devices which are not shown, and then the flue gas is released into the atmosphere together with cooling air via a cooling tower which is also not shown.

The combustion air which the plant needs for the boiler is supplied via a line 25, is heated to approximately 350° C. in the air preheater 24, and then is supplied to the fuelling or lignite pulverization dryer via a line 26.

The shown section of the water-steam cycle of the plant shows a feed-water container 27 in which the condensate, which is supplied via line 28, is heated by the steam from line 29. The heated water (feed-water) is removed from the feed-water container 27 via a line 30 which is pumped up to approximately 250–300 bar in a jetting pump and then is preheated to a temperature of approximately 250°–300° C. in a customary high-pressure preheater 32. The preheated feed-water flows into the economizer 21 via a line 33 in which is heated again through heat exchange with hot flue gas. The feed-water then is brought into the other heat exchanger system of the boiler via a line 34 and there evaporates or is superheated to the starting temperature of the steam turbine of approximately 530°–580° C.

After the pressure in the turbine is relieved, the steam is condensed and is again brought to the feed-water container 27 via line 28.

The above description of the system of a steam power plant is based on normal operations for full loads or partial loads.

The invention intends to make the start-up process of such a power plant more economical. For this purpose the invention calls for a start-up heat exchanger 35 with a section through which recirculated air flows and which is connected on the intake side to the fresh air outlet of the air preheater 24 via a line 36 and on the outlet side to the fresh air intake of the air preheater 24 via a line 37 and a ventilator 38.

Before or during the start-up process of the power plant the recirculated air which is between the air preheater 24 and the start-up heat exchanger 35 is heated inside the start-up heat exchanger 35 and is cooled again in the air preheater 24, whereby the regenerative heat accumulations of the air preheater heat up. This preheating process on one hand causes the flue gas, which is produced at the beginning of the start-up process, to not be cooled as much inside the air preheater so that the dew point underflow and related corrosion damage inside the air preheater and any subsequent plant devices can be prevented. Furthermore, it is possible to transmit additional heat to the combustion air via the recirculated air during the start-up process. This in turn makes it possible to reach the required temperature for starting the lignite pulverization dryer and therefore the temperature for starting the coal burner of the boiler quicker. The result is that now the auxiliary burners, which are operated with expensive oil or gas, can be shut off earlier, and the flue gas side can reach the operating temperatures quicker (corrosion).

In accordance with the example shown in the figure, the recirculated air of the heat exchanger 35 is heated through heat exchange with hot feed-water which is drawn off in the feed-water container 27 by injecting start-up steam which is transported via a line 29 and via lines 39, 40, 41 with the correspondingly opened valves 42 and 43, is cooled in the heat exchanger 35, and then is returned back into the feed-water container 27 via lines 44 and 45 and the open valve 46.

If necessary, the feed-water can be heated again before it enters the heat exchanger 35 by supplying at least a partial stream of the heated feed-water in line 39 via a now open valve 47 and a line 48 into another heat exchanger 49. The heat exchanger 49 is heated with the help of the condensed start-up steam from a source 50 which then is supplied into the feed-water container 27 via a line 51.

The feed-water stream, which is further heated in the heat exchanger 49, is first supplied into line 41 and then into the heat exchanger 35 via a line 52 and an open valve 53.

In accordance with another model of the invention, not only the air preheater 24 but also the economizer 21 is supplied with additional heat during the start-up process of the steam power plant. For this purpose at least a partial stream of the feed-water which was heated in the heat exchanger 49 is fed into line 33 via an open valve 54 and lines 44 and 55 and there is mixed with the feed-water from the high pressure preheater 32. This is shown in the example in the figure. Now it is possible to use the start-up heat. Due to the increase in temperature of the feed-water, the flue gas inside the economizer does not cool as much during the start-up process so that the minimum temperature for starting the subsequent nitrogen removal reactor 23 can be reached faster.

The heat transfer onto the storage accumulation of the air preheater 24 or the additional heat transfer onto the combustion air or the feed-water makes it possible to use the heat of the steam which is produced during the start-up phase. Storing the steam in the air preheater surfaces also makes it possible to use the steam which is produced in the course of the start-up phase.

The proposed coupling of the additional heat into the economizer proved to be beneficial not only during the start-up process of the power plant, but it can also be used for supporting the flue gas temperature, and therefore for maintaining the optimal operating temperature of the nitrogen removal reactor 23 during light load operation of the power plant.

By varying the amount of the recirculation air via the ventilator 38 as well as the transmitted heat amount inside the heat exchanger 35, the flue gas temperature after the air preheater 24 can be maintained at a constant level in the entire load area; this means that even during full load operation it is possible to obtain an optimally low flue gas temperature without having to accept any low temperatures and therefore corrosion during partial load, for example.

We claim:

1. A steam power plant for generating electric power has a fossil-fuelled boiler, a water-steam cycle for generating high-tension superheated steam for a steam turbine, an economizer to transmit heat from flue gas to the feed-water, an air preheater to transmit flue gas heat to fresh air, and devices for removing dust, sulphur and possibly nitrogen from the flue gas and is characterized in that it has a first heat exchanger system (16, 17) with a section through which recirculated air and a heat vehicle medium flow, whereby the section carrying the air is connected on the intake side (14) to the fresh-air outlet of the air preheater (4) and on the outlet side (13) to the fresh-air intake of the air preheater (4).

2. The steam power plant in accordance with claim 1 is characterized in that it has a second heat exchanger system (6, 11, 12) which transmits at least a part of the residual heat, which is still contained in the flue gas before the desulphurization process, to the fresh air.

3. The steam power plant in accordance with claim 1 is characterized in that the recirculation air stream of the first heat exchanger system (16, 17) can be adjusted (18).

4. The steam power plant in accordance with claim 1 is characterized in that the heat carrier fluid in the first heat exchanger system (16, 17) is feed-water from the water-steam cycle.

5. The steam power plant in accordance with claim 4 is characterized in that the heat in the first heat exchanger system (16, 17) which is to be removed for the most part can be transmitted to high pressure feed-water (16) and the remainder to low pressure feed-water (17) of the water-steam cycle.

6. The steam power plant in accordance with claim 2 is characterized in that the second heat exchanger system (6, 11, 12) is a closed system with water as a heat vehicle.

7. The steam power plant in accordance with claim 1 is characterized in that the fresh air can be heated through heat exchange with draw-off steam from the water-steam cycle of the power plant before it enters the air preheater.

8. The steam power plant in accordance with claim 1 is characterized in that the first heat exchanger system is a start-up heat exchanger (35), whereby the section which carries the air of the start-up heat exchanger (35) is connected on the intake side to the fresh-air outlet of the air preheater (24) and on the outlet side (37) to the fresh-air intake of the air preheater (24).

9. The steam power plant in accordance with claim 8 is characterized in that the heat vehicle medium inside the start-up heat exchanger (35) is hot water from the feed-water container (27) of the water-steam cycle of the steam power plant.

10. The steam water plant in accordance with claim 9 is characterized in that the feed-water can be further heated in a heat exchanger (49) which is heated with condensed steam before it is cooled inside the start-up heat exchanger (35).

11. The steam power plant in accordance with claim 10 is characterized in that the cooled feed-water and the condensed steam can be fed (25, 51) into the feed-water container (27).

12. The steam power plant in accordance with claim 8 is characterized in that at least a part of the heat vehicle medium for the start-up heat exchanger (35) can be used for increasing the feed-water temperature before economizer (21).

13. The steam power plant in accordance with claim 12 is characterized in that the heat vehicle medium is hot feed-water, which can be mixed with the feed-water, which is fed (33) into the economizer (21) after it is heated (49) again through heat exchange with condensed steam.

* * * * *